Oct. 18, 1955 D. E. REID 2,721,009
MEASURING DISPENSER DEVICE
Filed Jan. 15, 1953 2 Sheets-Sheet 2
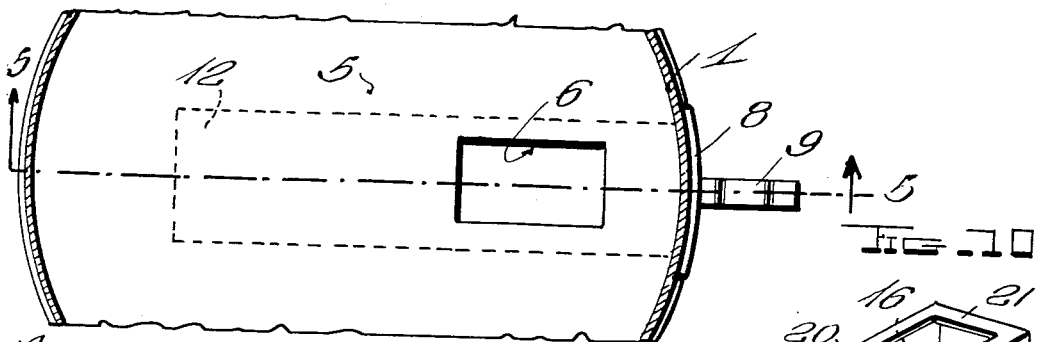
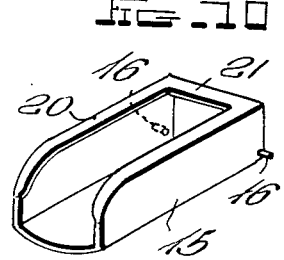
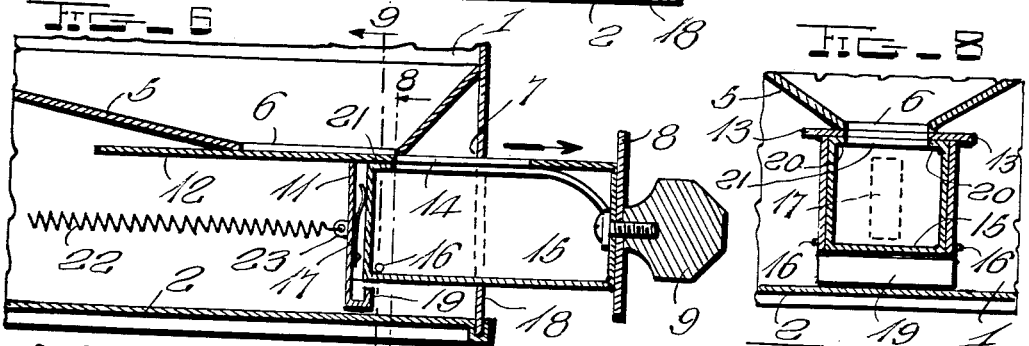
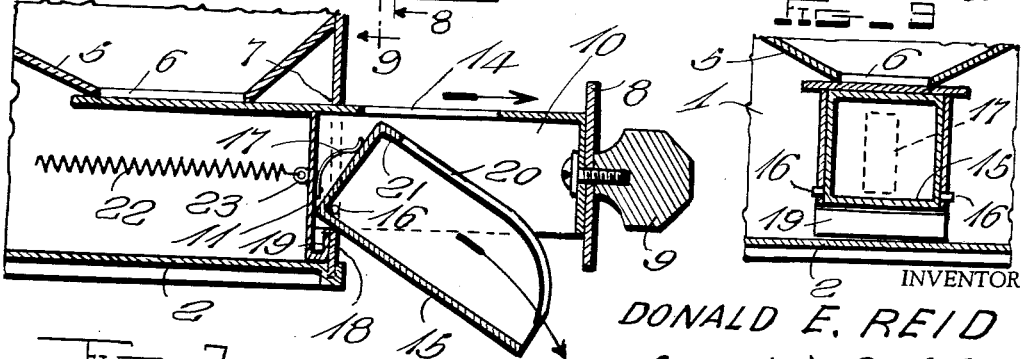
INVENTOR
DONALD E. REID
BY Lloyd W. Patch
ATTORNEY

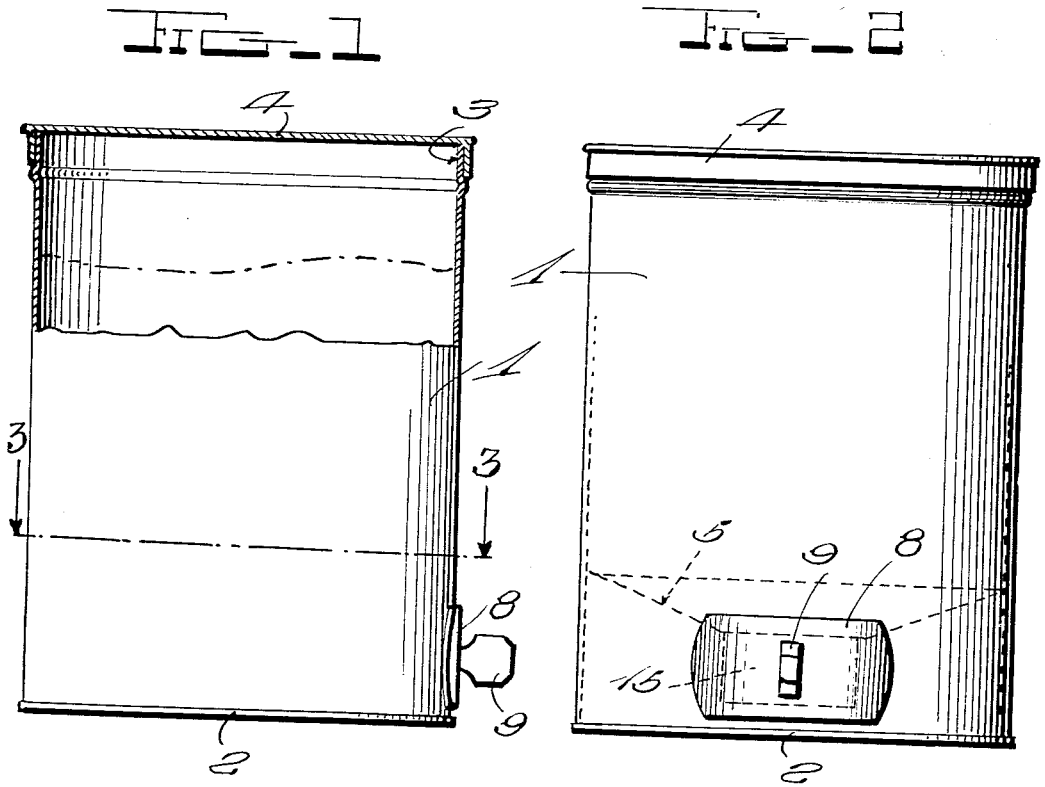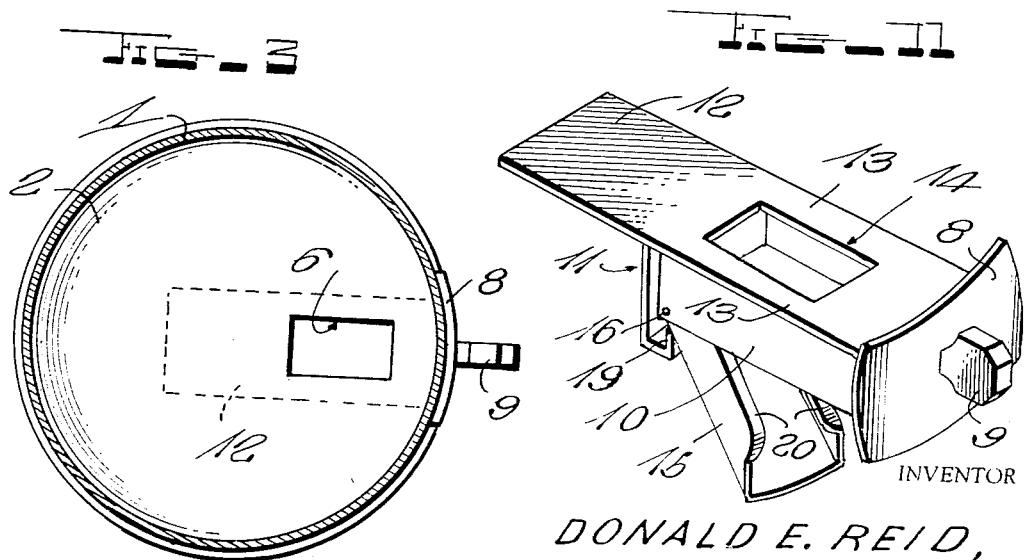

United States Patent Office 2,721,009
Patented Oct. 18, 1955

---

2,721,009
MEASURING DISPENSER DEVICE
Donald E. Reid, Toronto, Ontario, Canada Application January 15, 1953, Serial No. 331,395

1 Claim. (Cl. 222—336)

My invention relates to a measuring dispenser device and particularly to a drawer type of structure which can be used with various granular or grain-like or loose materials or articles to measure out and dispense a predetermined quantity of bulk.

An object is to provide a drawer type of measuring dispenser device which will take a desired measured quantity of material from a bulk of material in a container or hopper, and which will then cut off from the bulk and will automatically discharge and pour the measured quantity of material as a drawer is pulled out.

Another object is to provide structure of this character in which the parts are so constructed and fitted and cooperate in a manner to prevent spilling or clogging of pulverant or granular or loose materials in withdrawing and discharge or in return movement of the drawer.

Still another purpose is to provide a device of this character in which the supply of material will be accurately measured and when the parts are moved to the dispensing and discharging position the supply of material will be automatically cut off so that there will be no possibility of accidentally spilling or loss of material.

Still another purpose is to provide a device in which a pouring spout is provided to direct the discharge of the measured quantity of material, and with the spring means provided to positively urge the discharge spout to a pouring or discharge position, and means is provided to withdraw the drawer to a closed position.

With the above and other objects in view, some of which will be apparent to those skilled in the art, and others of which are inherent in the construction and operation and use of the device, my invention includes certain novel features of construction and combinations and arrangements and association of parts which will be hereinafter set forth in connection with the drawings and then pointed out in the claim.

Figure 1 is a view in side elevation of the measuring dispenser device embodying my invention, and with the upper part in section.

Fig. 2 is a view in front elevation of the structure shown in Figure 1.

Fig. 3 is a transverse sectional view substantially on line 3—3 of Figure 1.

Fig. 4 is an enlarged fragmentary sectional view substantially on line 4—4 of Fig. 5.

Fig. 5 is a fragmentary vertical sectional view substantially on line 5—5 of Fig. 4.

Fig. 6 is a fragmentary view of part of the disclosure in Fig. 5, showing the dispenser drawer withdrawn.

Fig. 7 is a view similar to Fig. 6 with the dispenser drawer pulled out to its full extent and with the dispensing spout in discharge position.

Fig. 8 is a transverse sectional view substantially on line 8—8 of Fig. 6.

Fig. 9 is a transverse fragmentary sectional view on line 9—9 of Fig. 6.

Fig. 10 is a perspective view to better show the pouring spout.

Fig. 11 is a view in perspective illustrating the drawer and slide and pouring spout assembly.

As stated, this device is primarily intended and adapted for measuring and dispensing loose or pulverant or granular or grain-like materials, such as coffee, sand, powdered material such as flour and cement and the like, nails, grains such as wheat or corn and the like, and other loose and pourable materials or parts, or the like. Accordingly, the device can and will be made in different sizes and constructions to suit the particular commodity and the particular conditions of use.

In the present instance I have illustrated an embodiment of my invention such as might be employed in measuring and dispensing ground coffee and like granular materials, and the parts are illustrated as being made of sheet metal or the like; however, it will be appreciated that my invention lends itself well to construction of the parts out of plastic, either molded or otherwise shaped, and to other suitable materials.

In the present illustration, the container 1 is disclosed as being a substantially cylindrical can having a closed bottom 2 and an open top at 3, a cover 4 being here provided to close the open top.

The container 1 has a supporting wall 5 secured therein above the bottom wall 2, this supporting wall being provided with a dispensing opening 6 which is preferably located adjacent to be spaced inwardly from a part of the wall of the container 1, as disclosed in Figs. 3 and 4. The opening 6 is here illustrated as being substantially rectangular and the supporting wall 5 is inclined upwardly in all directions from the opening 6 so that material filled into the container 1 will slide upon the upper face of the supporting wall 5 and will be directed to the dispensing opening 6.

The container 1 has a drawer opening 7 through one side thereof into the space between the bottom wall 2 and the supporting wall 5, and a drawer assembly is slidably mounted therein. This drawer assembly has a front 8 provided with a handle 9, and substantially rectangular side and inner end walls 10 and 11. A slide dispensing and cut off member 12 is connected with the drawer front and side and inner walls and has an end extending somewhat beyond the inner end wall of the drawer structure, with the side edges of the member 12 projecting laterally beyond the side walls 10. With this construction, the drawer portion has an open bottom.

The dispenser container 1 has laterally extending guideways adjacent to the upper edge of the drawer opening 7, and the drawer structure is fitted to slide therein with the side edges 13 within the guideways of the container 1. The slide dispensing and cut off member 12 has an opening 14 therethrough located to register and substantially coincide with the opening 6 when the drawer structure is moved to its closed position, and the inwardly extending end of the member serves to close the opening 6 when the drawer is pulled out. Thus, when the drawer is closed material can flow through the openings 6 and 14.

I provide a substantially rectangular material receiving and dispensing spout 15, perhaps best shown in Fig. 10, within the drawer space and beneath the opening 14, and this material receiving and dispensing spout is swingably mounted and is adapted to be moved to the position in Fig. 5 where it will receive and measure a quantity of material and to a pouring or dispensing position, as illustrated in Fig. 7, where it will discharge the material.

The material receiving and dispensing spout 15 is swingably mounted between the side walls 10 by hinge pins 16, or in any other suitable manner, so that this spout 15 will swing freely when the drawer structure is pulled out, as illustrated in Fig. 7, but to assure quick and positive action, I provide a spring 17 upon the inner wall 11 in position to bear against the inner end wall of the dispensing spout 15 and thus resiliently urge this spout toward the opened position. The bottom wall or edge 18 of the drawer opening 7 bears against the lower side of the bottom wall of the pouring spout 15 to hold this pouring spout in raised and closed position immediately inward movement of the drawer structure to the closed position is initiated. A stop 19 is provided on the back wall of the drawer to engage with the structure of the container 1, after the manner shown in Fig. 7, to limit outward or opening movement of the drawer so that the dispensing spout 15 will be held at a desired angle for pouring the material therefrom.

The slide dispensing and cut off member 12 has the opening 14 therethrough of less width than the width between the side walls of the spout 15, and the spout is so mounted that when the drawer is in the inner or closed position the inner end of the spout is rearwardly of the inner edge of the opening 14. To guard against material spilling over the sides and inner end of the spout 15, I provide overhanging flanges 20 and 21, as perhaps best shown in Fig. 10, and the pouring spout can thus be substantially filled with loose material or articles and the material or articles will not spill over the edges. As the spout moves to the pouring position, the loose material or articles will of course be poured out and the flange portions 20 and 21 will be entirely free of material or articles so that the pouring spout can be swung to a completely closed position when the drawer is closed.

To close the drawer and assure that this will remain closed, a coil spring 22 can be connected in eyes 23 on the back of the inner wall 11 and 24 on the opposite wall of the container 1, and this spring will serve to return the drawer to a closed position and to resiliently retain the drawer against accidental or casual opening.

While I have illustrated the various parts as being constructed of sheet metal or like material, it will be apparent that the parts of the drawer structure and other portions of the device can be made of molded plastic or other suitable and desired material, and that the parts can be constructed for the particular uses in which the device is to be employed.

In the present illustration I have disclosed a measuring dispenser device of a type that might be readily employed for measuring and dispensing and pouring ground coffee or other like materials; and, it will be appreciated that the device can be made in various sizes for measuring and dispensing loose grain or nails or other loose materials.

While I have herein shown and described only certain specific embodiments of my invention and have suggested only certain possible modifications, it will be appreciated that many changes can be made in the form and construction and arrangement and the assembly and association of the parts, without departing from the spirit and scope of my invention.

I claim:

A measuring dispenser device for granular material and loose items comprising, a container having a supporting wall at the bottom thereof provided with a substantially rectangular dispensing opening in its middle, slide dispensing and cut off member slidably mounted through one side of the container below the supporting wall having a continuous portion disposed beneath the dispensing opening to hold back material when the slide member is drawn out and provided with an opening registering with the dispensing opening in the supporting wall when the slide member is pushed in, a drawer structure carried by said slide member comprising outer and inner and side walls surrounding the opening through the slide and leaving the bottom open, a rectangular material receiving and dispensing spout provided with an inner end and two side walls leaving the outer end open, overhanging flanges on the two side walls at the top thereof, hinge pin means swingably mounting said dispensing spout at its lower inner corner within the opening of the drawer structure with the swinging corner disposed adjacent to the inner end wall of the drawer structure, means resting beneath the bottom of the dispensing spout normally raising the swinging end thereof when the drawer is closed to thus bring the overhanging flanges against the under side of the supporting bottom wall on opposite sides of the dispensing opening so that loose and granular material will be prevented from spilling over the sides of the dispensing spout and to confine material within said dispensing spout, spring means bearing upon said dispensing spout at a point away from the swinging mounting to swing said spout to a downwardly inclined pouring position when the drawer is opened, and spring means normally urging said slide and drawer structure and spout to closed positions.

References Cited in the file of this patent

UNITED STATES PATENTS

| 470,018 | Strong | Mar. 1, 1892 |
| 471,670 | Jones et al. | Mar. 29, 1892 |
| 1,298,003 | Byrum | Mar. 25, 1919 |
| 1,980,057 | Horkavi | Jan. 15, 1934 |